Figures 1, 2:
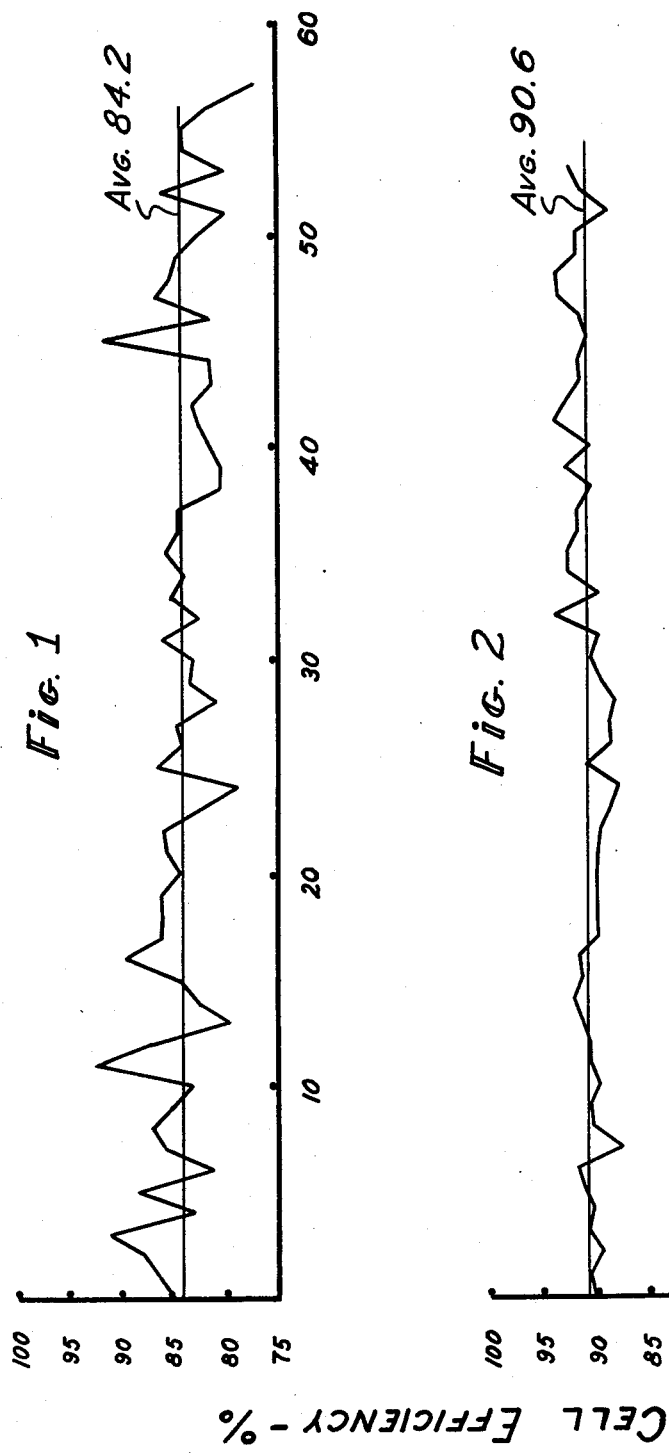

Jan. 28, 1964  W. H. THOMAS  3,119,756
PRODUCTION OF SODIUM
Filed Oct. 22, 1962

TIME – DAYS

CELL EFFICIENCY – %

3,119,756
PRODUCTION OF SODIUM
Wilford H. Thomas, Baton Rouge, La., assignor to Ethyl
 Corporation, New York, N.Y., a corporation of
 Virginia
Filed Oct. 22, 1962, Ser. No. 232,004
6 Claims. (Cl. 204—68)

This invention relates to a new and improved method for the production of metallic sodium by the electrolysis of a fused bath. This application is a continuation-in-part of application Ser. No. 146,442, filed October 20, 1961, which in turn is a continuation-in-part of Ser. No. 860,660 filed December 21, 1959, both now abandoned.

The present commercial method for the production of metallic sodium involves electrolysis of a fused bath composition consisting of the chloride salts of sodium and calcium. Electrolysis is generally conducted in a Downs type cell as described in U.S. 1,501,756 (1924). This process has been employed for over 35 years and, insofar as known, has been the only commercially successful process used during this time for the production of metallic sodium.

Unfortunately, however, this long-used process of electrolyzing a fused bath of calcium chloride and sodium chloride to form sodium metal has a number of shortcomings. Many of the shrtcomings are due to the solubility of calcium metal in sodium metal. Great expense is incurred through the necessity of having to provide for the removal of the calcium from the sodium product. In the process the preponderance of the calcium metal must be removed after the metallic product is displaced from the fused bath and prior to discharge from the cell. Thus, the product is passed upward through a zone of decreasing temperature gradient prior to discharge. The sodium metal solution gradually cools during its ascent thereby causing precipitation of the less soluble calcium metal. Most of the calcium metal precipitated gravitates downward and is returned to the fused bath. However, there is a tendency for two much calcium metal to remain in the sodium product. Furthermore, much of the calcium adheres to the walls of the apparatus or cell within which the process is carried out and creates very expensive removal problems. Thus, complex and expensive stirring apparatus is generally used in conjunction with sodium cells (U.S. 2,770,364). Maintenance of this apparatus is also extremely expensive.

In addition to calcium impurities in the product, the presence of the calcium within the fused bath itself also produces many highly undesirable features. One highly undesirable phenomenon is that of "calcium bridging"— i.e., precipitation of calcium between the anode and cathode or between the cathodes and the diaphragms which are used in present cells. This bridging or short circuiting causes decreased current efficiency and decreased diaphragm life.

Despite the many disadvantages of this calcium chloride-sodium chloride bicomponent composition, a better and equally practical fused bath composition had not been found prior to this invention. Methods employing other fused bath compositions have been suggested as replacements. However, these methods require three or more fused bath systems. Typical of suggested compositions are the tricomponent mixtures: sodium chloride, sodium fluoride and barium chloride; potassium chloride, potassium fluoride and barium chloride (U.S. 841,724); potassium chloride, sodium chloride and at least one alkaline earth chloride (U.S. 464,097); sodium chloride, barium chloride and strontium chloride (U.S. 2,850,442); etc. Even more complex systems too numerous to mention have been suggested. These systems, however, have proven impractical largely because of their complexity and because of the new problems which they have produced.

For example, among the drawbacks of these complex systems is that they include salts which are often toxic and expensive. Furthermore, where it is necessary to maintain a complex mixture of three or more salts within definite concentrations, analysis and control problems become acute. Samples must be taken and submitted to a control laboratory for exact determination of the concentrations of the component salts. The make-up proportions of salts must then be determined and the necessary deficient components added in definite proportions by workers who are largely untrained in scientific principles.

Frequently at least a part of the bath must be drawn off and fresh salts added in the desired proportions to produce the fused mixture desired. Obviously all of this is quite troublesome and costly in a commercial establishment employing numerous cells. Hence it is understandable that complex systems involving three or more salts have met with little commercial success. In sharp contrast, a bicomponent fused bath composition does not encounter problems of this magnitude and a new and improved bicomponent system constitutes a long-standing need in the art.

Accordingly, it is an object of the present invention to provide a new method for the production of metallic sodium which eliminates the foregoing and other difficulties. In particular, it is an object of this invention to provide a new and improved method for the production of purer metallic sodium while providing increased current efficiencies, and increased cell and diaphragm life. Even more specifically, it is an object of the present invention to provide a new and commercially feasible method employing a bicomponent cell bath composition which produces high purity metallic sodium while providing improved conductivity, improved current efficiencies, increased diaphragm and cell life and which does not require frequent and complex analysis and control to maintain the bath according to close specifications.

These and other objects are achieved according to the present invention which is a process for the preparation of metallic sodium comprising electrolyzing a molten fused salt composition consisting essentially of a mixture of from about 40–15 weight percent sodium chloride and from about 60–85 weight percent strontium chloride, while recovering metallic sodium from the composition. Even more optimum advantages are achieved by electrolyzing a fused salt composition consisting essentially of from about 65–75 weight percent strontium chloride and from about 35–25 weight percent sodium chloride.

In other words, the process comprises passing a direct electric current through a bicomponent fused salt composition comprising about 60–85, and preferably about 65–75, weight percent strontium chloride, the balance of the composition being essentially sodium chloride.

The above electrolysis process is preferably conducted at a temperature of from about 565° C. to about 670° C. An even more preferred range, however, is from about 610° C. to about 650° C. because operation within this range provides greater power efficiencies with essentially no sacrifice in current efficiency. When operation of the cell is carried out within a range of from about 630° C. to about 650° C., even better results are obtained; not only are greater savings in power consumption accomplished but also cell encrustation problems are further reduced and greater cell operating stability is attained. During electrolysis the metallic sodium, being lighter than the fused bath, is displaced by the fused bath and rises to the surface of the molten mixture from whence it is collected. The strontium chloride remains behind within the molten bath and in general needs to be replenished only as a result of spills, evaporation, or leaks from the bath.

In sharp contrast to an electrolytic process employing a calcium chloride-sodium chloride bath, the present process employing a strontium chloride-sodium chloride bath offers far-reaching advantages. The metallic sodium product is of very high purity, containing less than 0.1 percent strontium metal or other impurities. This is less than 20 percent of the impurities ordinarily contained in sodium produced from a calcium chloride-sodium chloride bath.

Another very important distinction is that the current efficiency of the present process is greatly improved over that of the conventional old process using calcium chloride. The present invention provides for a current efficiency increase up to 5 percent or more as can be seen by reference to the figures of the drawing.

FIGURE 1 in the drawing depicts the typical erratic cell efficiencies experienced with calcium chloride-sodium chloride baths. FIGURE 2 depicts the much higher and less erratic cell efficiency made possible by the unique bicomponent fused bath of this invention.

These results are even more significant when considered in light of the fact that the unique fused bath provided by way of this invention tolerates a higher alkalinity during operation. That is, where the conventional sodium chloride-calcium- chloride cell cannot tolerate more than about 0.01 percent sodium oxide by weight alkalinity and still achieve desirable efficiencies, it has been found that the process of this invention can tolerate an alkalinity as high as 0.04 percent, preferably however 0.02 percent, and still achieve these higher current efficiencies. By alkalinity is meant the presence of metallic sodium, calcium, strontium, aluminum, magnesium, the oxides and hydroxides thereof, and the like expressed in terms of percent sodium oxide.

Of extreme importance also is the complete elimination of the problem of "calcium bridging" and as a consequence a significant increase in diaphragm life is achieved in the practice of this invention. Another extremely important advantage of the instant invention is that there is no precipitation of solid metal upon the cathode of the cell. Thus, there is no necessity to provide mechanical methods for removing metallic deposits from the cathode, a costly prior art practice. In addition, the present invention provides a method utilizing a bicomponent molten salt mixture from which high purity metallic sodium can be produced without the problems caused by the formation of double compounds produced by reaction between bath components.

The following examples demonstrate the invention but should not be construed as limitations thereof. All parts are given in weight units except where otherwise specified.

Example I

A composition of 73 percent industrially pure strontium chloride and 27 percent sodium chloride was melted at 565° C. and charged into a conventional Downs cell. The fused composition was electrolyzed at 6.0–6.4 volts whereupon the temperature rose slightly to 580° C. and was maintained at approximately this temperature. Metallic sodium was displaced to the top of the fused bath and was collected. A current efficiency was achieved which averaged at least 5 percent greater than that possible with a conventional sodium chloride-calcium chloride bath. Inspection of the equipment after the run revealed that diaphragm and cell life was greatly improved, especially the former which had only the barest amount of encrustations. There was no excessive corrosion.

The metallic sodium produced was of very high purity; viz., less than 0.1 percent impurities. In contrast, metallic sodium produced under similar conditions using a conventional bath containing calcium chloride rather than strontium chloride contained 0.75 percent impurities. The purity of the sodium from the process of the present invention was even further improved by cooling and decanting.

Example II

Example I was again repeated in all details except that in this instance a fused composition of 77 percent strontium chloride and 23 percent sodium chloride was employed and the electrolysis conducted at a temperature of 590° C.

Again an extremely high purity metallic sodium was obtained, and with greatly improved current efficiency. Improved diaphragm and cell life also resulted.

Example III

Example I was again repeated except that in this instance a fused bath composition consisting essentially of 70 percent strontium chloride and 30 percent sodium chloride was employed and the electrolysis conducted at a temperature of 580° C. As in the foregoing examples, highly satisfactory results were obtained—viz., higher purity sodium was produced, along with the other benefits stated in Example I.

Example IV

When a fused salt composition of 68 weight percent strontium chloride and 32 weight percent sodium chloride was electrolyzed at 6.6 volts and 613° C., it was found that very high purity sodium was taken from the cell. Current efficiency was 92 percent.

Example V

A fused bath composition consisting essentially of 68–70 weight percent strontium chloride, the remainder of the composition being sodium chloride, was electrolyzed at a voltage of 7.4 and at a temperature of from about 620–640° C. Over a period of 53 days an average current efficiency of 90.6 percent was realized. The metallic sodium produced was of a purity of 99.9 percent.

Example VI

A molten composition consisting essentially of 85 weight percent strontium chloride and 15 weight percent sodium chloride is electrolyzed at 670° C. at a voltage of 6.6. An average current efficiency approaching 90 percent is obtained over an extended period of operation. Inspection of the diaphragm reveals essentially no encrustation or corrosion. Metallic sodium of a purity exceeding 99.9 percent is obtained.

It is not necessary to use absolutely pure materials in the process of this invention in that industrially pure materials containing as low as a few thousandths of a percent impurities can be employed. It is important to employ industrially pure materials to prevent the buildup or concentration of impurities over a period of time of operation. Specifically, the amount of other chloride salts inadvertently added as impurities to the fused bath over that period of time between rebuilding of an individual cell should not exceed 2.5 percent. This is possible by employing as raw materials pursuant to this invention strontium chloride having a composition of:

| | Percent |
|---|---|
| $SrCl_2$ | min__ 98.00 |
| $CaCl_2$ | max__ 0.25 |
| $BaCl_2$ | max__ 0.50 |
| Other | Balance | and sodium chloride having a composition of:

| | Percent |
|---|---|
| NaCl | min__ 99.800 |
| $CaCl_2$ | max__ 0.010 |
| $MgCl_2$ | max__ 0.010 |
| KCl | max__ 0.020 |
| $BaCl_2$ | max__ 0.002 |
| Other | Balance |

Employing raw materials having the above compositions is a preferred manner to accurately maintain the unique fused bath composition of this invention. Thus, a highly preferred embodiment of the instant invention is a fused bath composition consisting essentially of from about 25 to about 35 percent sodium chloride and from about 75 to about 65 percent strontium chloride containing a maximum of 2.5 percent of other chloride salts unavoidably added as entrained impurities. The amount of impurities unavoidably and unintentionally added is negligible, especially by way of the strontium chloride which is only replenished periodically to make up for minor losses from the system as a result of spills, evaporation, or leaks from the bath. On the other hand, sodium chloride is added quite frequently or continually. Thus, it follows that the sodium chloride is the principal source of contamination of the fused bath. Much of the impurities introduced into the system are electrolyzed which aids in maintaining the presence of other chloride salts or ingredients below 2.5 percent. For example, employing a sodium chloride of a quality disclosed above, which is a typical industrial pure grade, the calcium, potassium, and magnesium chloride salts are electrolyzed leaving behind as the principal impurity barium chloride which cannot build up above 2.5 percent throughout normal operation.

Another highly preferred embodiment of the instant invention is a process employing a bicomponent fused bath and comprising:

(1) charging an electrolytic cell with a mixture consisting essentially of from about 25 to about 35 percent sodium chloride and from about 75 to about 65 percent strontium chloride containing a maximum of 2.5 percent of other chloride salts,
(2) passing a direct electric current through said bicomponent fused bath to produce metallic sodium,
(3) replenishing said strontium chloride from a source of strontium chloride of a purity of 98 percent minimum and replenishing said sodium chloride from a source of sodium chloride of a purity of 99.8 percent minimum whereby the buildup of other chloride salts is maintained less than 2.5 percent, and
(4) separating said metallic sodium from said fused bath.

It is even more preferable in the above embodiment to maintain the fused bath with 65–75 weight percent of strontium chloride, the balance being sodium chloride plus up to 2.5 percent of impurities. The preferred temperatures at which these embodiments are conducted have been described hereinabove.

The present invention achieves highly beneficial and unexpected results in that a significant increase in cell efficiency is realized over that heretofore possible in prior art bicomponent systems. In fact, the cell efficiency experienced in the practice of this invention is, in general, as good as or better than that attributed to more complex and costly cell bath systems containing three or more components. An average cell efficiency of about 90–93 percent is easily realized under the preferred conditions of this invention. As shown by FIGURE 2 in the drawing, in one run following the process of this invention, which was arbitrarily terminated after 53 days of continuous operation without any evidence of impending difficulty, an average cell efficiency of 90.6 percent was realized. This represents a net gain of 6.6 percent over the average cell efficiency of 84.2 percent shown in FIGURE 1 as the result of the electrolysis of a calcium chloride-sodium chloride fused bath conducted in identical apparatus under optimum commercially used conditions for a conventional Downs cell such as disclosed on page 29, last paragraph in the text entitled "Sodium—Its Manufacture, Properties and Uses" by Marshall Sittig, Reinhold Publishing Corporation, 1956. Following that technique, the diaphragm when removed from operation evidenced considerably more encrustations, principally calcium deposits, and corrosion.

Equally surprising, is the decreased amplitude or variation of cell efficiencies experienced in the present invention. This striking improvement can be graphically appreciated by superposing FIGURE 1 which depicts the typical erratic cell efficiency fluctuation of prior art calcium chloride-sodium chloride fused baths on FIGURE 2 which depicts the higher and much smoother operation attainable by way of this invention. The average mean fluctuation of cell efficiency in FIGURE 1 was 2.34 whereas in FIGURE 2 it was 1.16; viz., one-half the amplitude. Transposing this in other terms means that very little short circuiting is experienced in the unique composition of this invention. The end result is greatly improved diaphragm life.

Another economical advantage of the novel fused bath composition of this invention is that the problem of controlling bath concentration is minimized. The net result is a savings in operators' time and routine laboratory analysis of bath compositions.

Having described the invention, what is claimed is:

1. A method for the production of high purity metallic sodium comprising passing a direct electric current through a bicomponent fused bath mixture consisting essentially of from about 15 to about 40 percent sodium chloride and from about 85 to about 60 percent strontium chloride and recovering the metallic sodium displaced from the fused bath mixture which contains a maximum of 2.5 percent of other chloride salts as impurities.

2. The process of claim 1 further characterized in that said fused bath mixture is maintained at a temperature of from about 565° C. to about 670° C.

3. A method for the production of high purity metallic sodium by the electrolysis of a bicomponent fused bath comprising:

(a) charging an electrolytic cell with a mixture consisting essentially of from about 25 to about 35 percent sodium chloride and from about 75 to about 65 percent strontium chloride containing a maximum of 2.5 percent of other chloride salts,
(b) passing a direct electric current through said bicomponent fused bath to produce metallic sodium,
(c) replenishing said strontium chloride from a source of strontium chloride of a purity of 98 percent minimum and replenishing said sodium chloride from a source of sodium chloride of a purity of 99.8 percent minimum whereby the buildup of other chloride salts is maintained less than 2.5 percent and a bath alkalinity of less than 0.04 percent sodium oxide by weight is maintained,
(d) separating said metallic sodium from said fused bath.

4. The process of claim 3 further characterized in that the temperature of said bicomponent fused bath is maintained at a temperature of from about 630° C. to about 650° C.

5. In a method for the production of high purity metallic sodium by the electrolysis of a fused bath composition, the improvement comprising employing as the principal constituent of said fused bath about 60 to about 85 percent strontium chloride, the balance of said fused bath consisting of sodium chloride and up to 2.5 percent of other chloride salts as impurities.

6. A fused bath composition for the production of metallic sodium by electrolysis consisting essentially of, by weight, about 60 to about 85 percent strontium chloride and about 40 to about 15 percent sodium chloride, other ingredients if present limited to a maximum of 2.5 percent.

References Cited in the file of this patent

UNITED STATES PATENTS 2,850,442     Cathcart _____ Sept. 2, 1958